United States Patent
D'Angelo

(10) Patent No.: US 6,932,363 B2
(45) Date of Patent: Aug. 23, 2005

(54) PORTABLE UNIVERSAL CART

(76) Inventor: Eduardo Felipe D'Angelo, 9360 Fontainebleau Blvd. #302, Miami, FL (US) 33172

( * ) Notice: Subject to any disclaimer, the term of this patent is extended or adjusted under 35 U.S.C. 154(b) by 158 days.

(21) Appl. No.: 10/386,239

(22) Filed: Mar. 11, 2003

(65) Prior Publication Data

US 2003/0197339 A1 Oct. 23, 2003

Related U.S. Application Data

(60) Provisional application No. 60/373,931, filed on Apr. 20, 2002.

(51) Int. Cl.[7] .............................................. B62B 3/02
(52) U.S. Cl. ............................. 280/33.991; 280/33.996; 280/651; 280/47.35; 280/79.3; 211/126.6
(58) Field of Search ....................... 280/33.991, 33.995, 280/33.996, 33.997, 33.998, 651, 47.19, 47.34, 47.35, 79.3; 211/88.02, 90.02, 126.6, 130.1

(56) References Cited

U.S. PATENT DOCUMENTS

| | | | | |
|---|---|---|---|---|
| 2,133,834 A | * | 10/1938 | Sheldon | 280/47.35 |
| 2,212,053 A | * | 8/1940 | Smith | 280/651 |
| 2,398,863 A | * | 4/1946 | Sides | 280/641 |
| 2,680,522 A | * | 6/1954 | Temple | 108/59 |
| 2,901,262 A | * | 8/1959 | Berlin | 280/641 |
| 3,052,484 A | * | 9/1962 | Huffman et al. | 280/654 |
| 3,118,553 A | * | 1/1964 | Rosenzweig | 414/469 |
| 3,121,496 A | * | 2/1964 | Brunette | 211/126.8 |
| 3,191,959 A | * | 6/1965 | Heimbruch et al. | 280/641 |
| 3,534,973 A | * | 10/1970 | Elliot | 280/33.992 |
| 3,774,929 A | * | 11/1973 | Stanley | 280/641 |
| 3,834,724 A | * | 9/1974 | Trubiano | 280/33.996 |
| 3,913,935 A | * | 10/1975 | McGillicuddy | 280/641 |
| 4,045,043 A | * | 8/1977 | Fourrey | 280/79.3 |
| 4,047,724 A | * | 9/1977 | Shaffer | 280/5.22 |
| 4,978,013 A | * | 12/1990 | Hogg | 211/133.2 |
| 5,558,359 A | * | 9/1996 | Phears | 280/654 |
| D399,625 S | * | 10/1998 | Murphy et al. | D34/21 |
| 5,863,055 A | * | 1/1999 | Kasravi et al. | 280/47.29 |
| 5,865,449 A | * | 2/1999 | Castaneda | 280/33.996 |
| 6,126,181 A | * | 10/2000 | Ondrasik | 280/33.991 |
| 6,454,293 B1 | * | 9/2002 | Anderson | 280/651 |
| 6,644,674 B2 | * | 11/2003 | Simard | 280/33.991 |

FOREIGN PATENT DOCUMENTS

| | | | | |
|---|---|---|---|---|
| DE | 3627790 A1 | * | 2/1988 | 280/33.991 |
| GB | 2177354 A1 | * | 1/1987 | 280/33.991 |

* cited by examiner

Primary Examiner—Christopher P. Ellis
Assistant Examiner—Jeff Restifo
(74) Attorney, Agent, or Firm—Laurence Edson; Ruben Alcoba

(57) ABSTRACT

A collapsible and portable cart for universal use in a wide variety of residential and commercial environments, transporting different and various items, while shopping, gardening, laundry, transporting boxes or luggage, etc. The cart has base portion with wheels, which enable to move over the ground and a first foldable basket for heavy loads; and the rapper portion, that has a second foldable basket. Base portion is pivotally connected to the upper portion by link arms and secured by locking mechanisms. Both baskets have locking mechanism to keep the foldable screens in an upright position. The portable universal cart includes a receptacle with compartments, having different devices, to make the use of the cart more pleasing, safe and with more comfort for the user. The portable universal cart has different configurations according to the user's need.

16 Claims, 8 Drawing Sheets

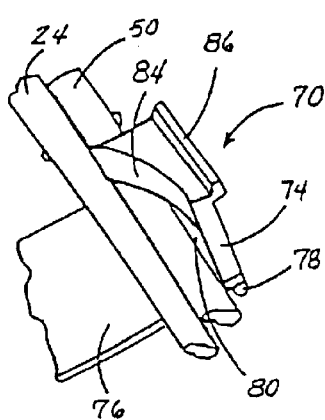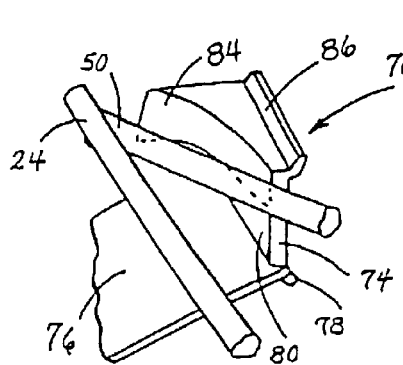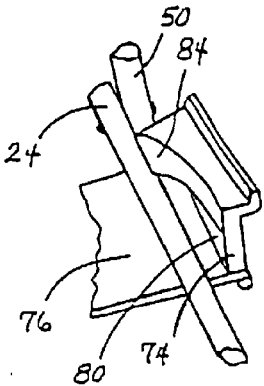
FIG. 4A     FIG. 4B     FIG. 4C
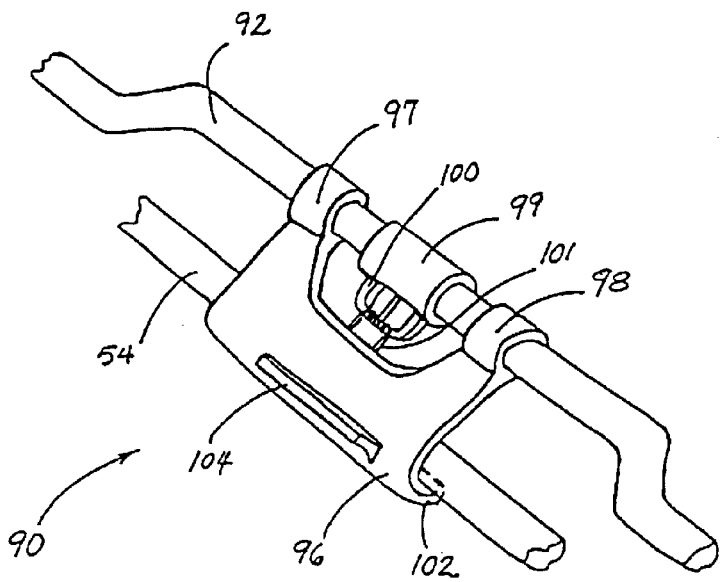
FIG. 5

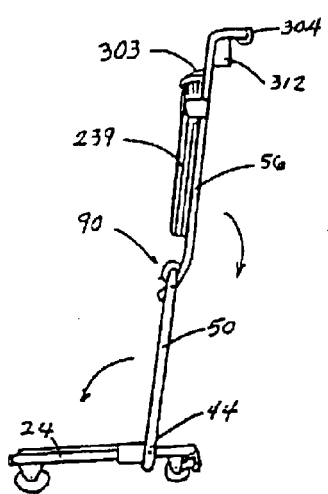 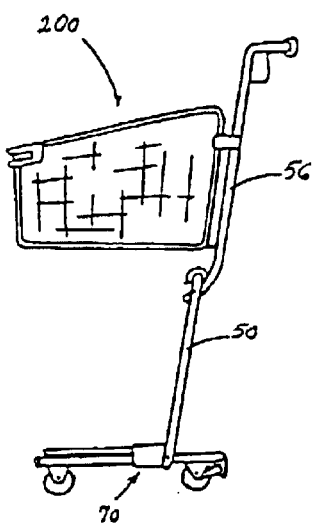 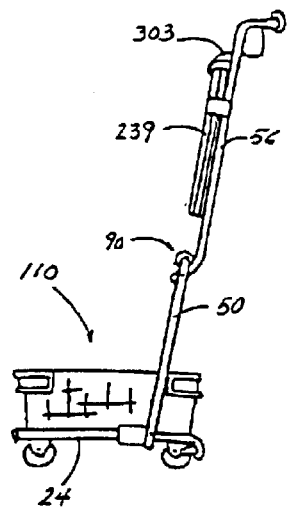
FIG. 15  FIG. 16  FIG. 17
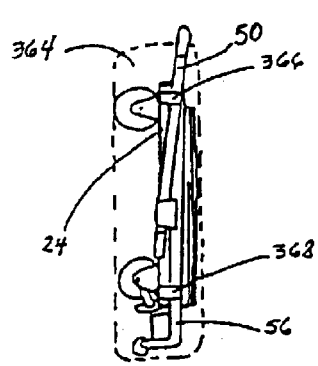 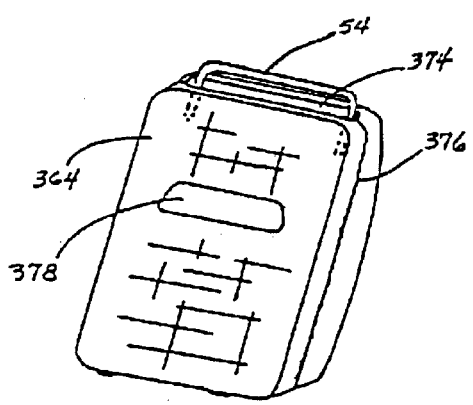
FIG. 18  FIG. 19

PORTABLE UNIVERSAL CART

This application is the Non-Provisional Application for the Portable Universal Cart with patent Application No. 60/373,931, filed on Apr. 20, 2002 as Provisional Application. Applicant: Eduardo F. D'Angelo, U.S citizen, from Miami, Fla., USA.

BACKGROUND OF THE INVENTION

This invention relates to the field of carts, and more particularly to a portable and collapsible cart for universal use.

This invention refers to a versatile, yet readily collapsible and portable cart, able to meet a wide range of needs, more particularly targeted to the individual/home user and to the tasks which are normally associated with, like shopping, gardening, transporting boxes, luggage, etc.

Although various collapsible carts have been previously manufactured to enable them to be conveniently carried and to occupy a small storage space, it has been found that they are really far from the shape, structure and appearance of conventional shopping carts used in supermarkets and malls. Users would like to go shopping with a cart that has a professional look and appearance, to be foldable and able to put in the trunk of the vehicle, not a box with wheels, as many early models exist on the market.

There are many shopping areas where no exist shopping carts or if they have, belong to one specific store only. These cause problems to the user to go shopping. Even if the users go to a shopping place and use the shopping carts existing in a particular store and put the items inside the trunk of the vehicle, they will have the problem to carry the items from the vehicle to the house, mainly if you need to park far to the house, when you live in a high rise building, a condominium or a complex apartment.

Further, existing carts does not have compartments to store personal valuables items and a place to put a CD player, snack or the like, while the person uses the cart.

Existing carts does not have a device to hold and umbrella if you need to use the cart while it is raining or too hot under the sun. Existing carts does not have an adjustable holder to hold a glass, can or bottle, neither a rear view mirror for safety while using the cart.

What has been needed is a multipurpose foldable cart that includes safe and convenient collapsibility for compact storage, and possible to be reconfigured for use with a wide variety of uses, not to be used only as a shopping cart for grocery stores, but which can also be configured without inconvenience to be compatible for use in other home, consumer, retail and commercial operations without the need to purchase an additional cart.

The best solution is the user to have their own cart, to go to the store for shopping and using the same cart for laundry, gardening, transporting boxes and luggage from any place to the vehicle and transporting later the items from the vehicle to home and vice versa. In general, to have only one cart for different purposes.

It is, therefore, an object of the present invention, to provide a portable universal cart which does not have the aforementioned disadvantages and which in addition also has other advantages unavailable in previous proposed carts.

BRIEF SUMMARY OF THE INVENTION

Accordingly, this invention relates to a foldable and collapsible cart comprising a base portion including wheels to roll the cart over the ground with brakes to stop the vehicle over the ground and a foldable basket, an upper portion with a second foldable basket, with linking arms pivotally connected to base and upper portion, allowing to collapse the cart, and two locking mechanisms associated with the linking arms to secure the upper portion in an upright position.

Further, the portable universal cart, have baskets that can be foldable independently, according the user's need.

Each basket has locking mechanisms to keep their foldable screens in an upright position.

In general, the portable universal cart has base and upper portion collapsible, including the baskets, allowing being the whole unit portable and handy.

Accordingly, the portable universal cart has a pedal in the base portion to easily go to a different surface elevation, like a step, stair or sidewalk.

It is an object of the present invention to have a portable universal cart able to use in different climate condition as rain or sun, having a device to hold an umbrella.

It is an object of the present invention to make the user enjoys the time while they are shopping or transporting items, to listen music, drink a beverage because exist different receptacle to hold these items.

Additionally, the present invention provides a compartment to hold a rear view mirror and a compartment with a key lock to hold values safely.

The present invention for the portable universal cart has reflecting pads to make more safety if you are using the cart in a dark environment or at night.

It is an object of the present invention to create a cart able to use in different configurations depending of the items or purposes.

It is an object of this invention creates a collapsible and portable cart with the appearance of the conventional no collapsible shopping carts used in the supermarkets, malls and stores in general, with addition of numerous advantages and to have a universal cart in the vehicle to solve any problem referring to carry and transport items, without the necessity to purchase an additional cart.

Still another object of the invention is to provide an improved portable and collapsible cart for any purpose, mainly for home and commercial use.

Finally, another object of this invention is to provide an improved collapsible and portable cart, which is aesthetically new and pleasing with a nice and attractive appearance.

BRIEF DESCRIPTION OF THE DRAWING

For a fuller understanding of the invention, reference is made to the following description, taken in connection with the accompanying drawings, in which:

FIG. 4A is a perspective view of the locking mechanism for lower link arms in foldable position;

FIG. 4B is a perspective view of the locking mechanism for lower link arms in the process to get the upright position;

FIG. 4C is a perspective view of the locking mechanism for lower link arms in the upright and unfold position;

FIG. 5 is the perspective view of the locking mechanism for upper link arms to keep the upper portion in upright position;

FIG. 15 is a side elevation view for the portable universal cart having both baskets in a foldable position;

FIG. 16 is a side elevation view for the portable universal cart with the upper basket in an unfold position;

FIG. 17 is a side elevation view for the portable universal cart with the base basket in an unfold position;

FIG. 18 is a side elevation view of the portable universal cart inside the case, in a foldable position;

FIG. 19 is a perspective view of the case, with the portable universal cart inside, ready to carry in a portable position by a hand.

DETAILED DESCRIPTION OF THE INVENTION

Figure 1:
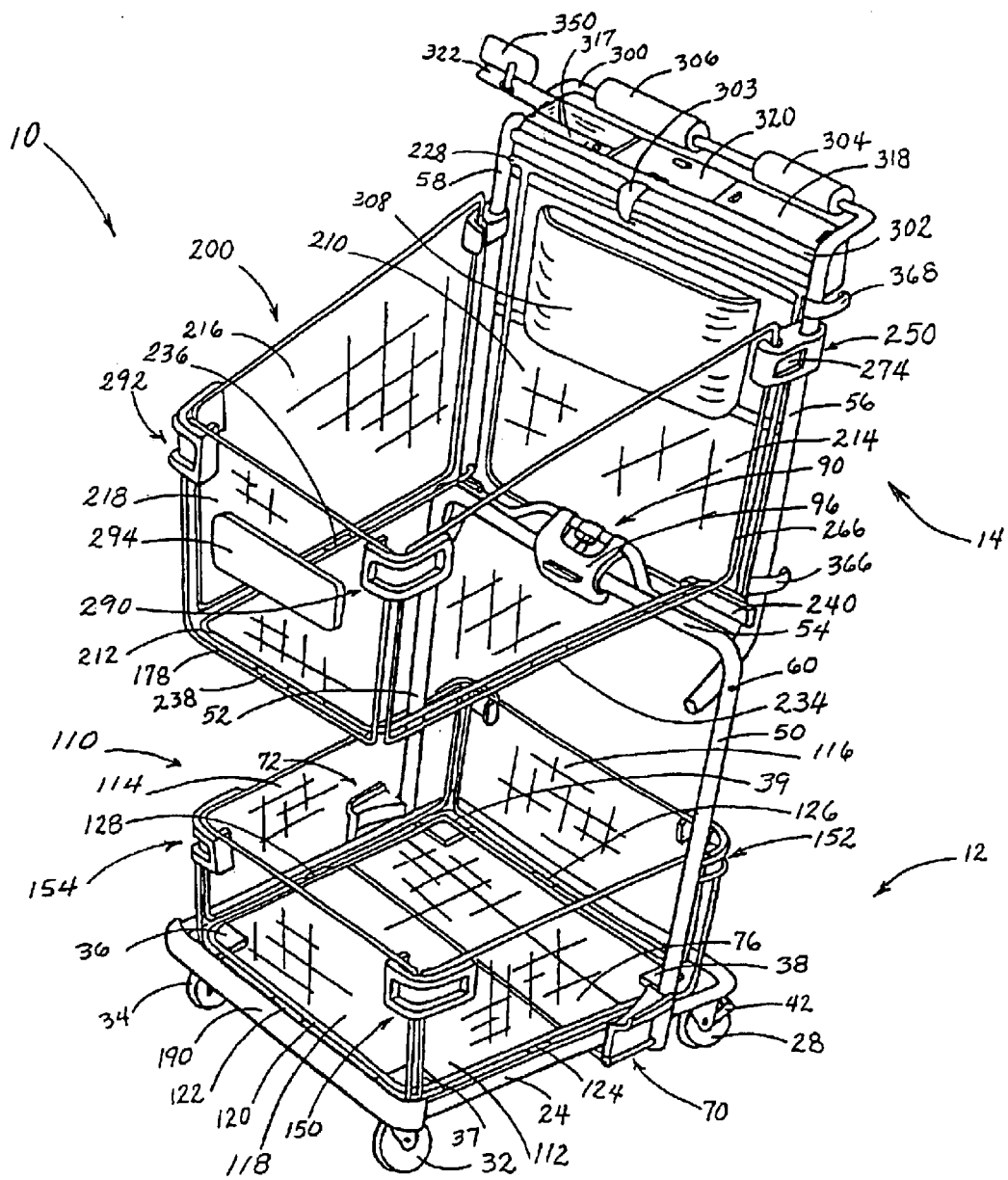
FIG. 1 is a perspective view of the preferred embodiment of the portable universal cart of the present invention.

The portable universal cart of this invention is illustrated in FIG. 1, and designated generally by reference numeral 10. Portable universal cart 10 of this invention can be broken down into the following components, namely, base portion 12 and upper portion 14. Each of these components will be discussed in detail below.

The Base Portion

The base portion 12 is a platform with wheels to supports the portable universal cart 10 above the ground surface. The base portion 12 comprises a foldable base basket 110. Base portion 12 has a shape and configuration to support upper portion 14 of portable universal cart 10 as well as contain the parts and mechanisms required to use the portable universal 10 cart over the ground surface, the locking mechanisms, the braking mechanism, as well as the arms to which the pivotal link between the base portion 12 and the upper portion 14 can be secured, all as will hereinafter be described.

In the preferred embodiment, the base portion 12 comprises a framework 24. Framework 24 is preferably constructed from metal or hard plastic, which presents an attractive outward appearance.

Figure 2:
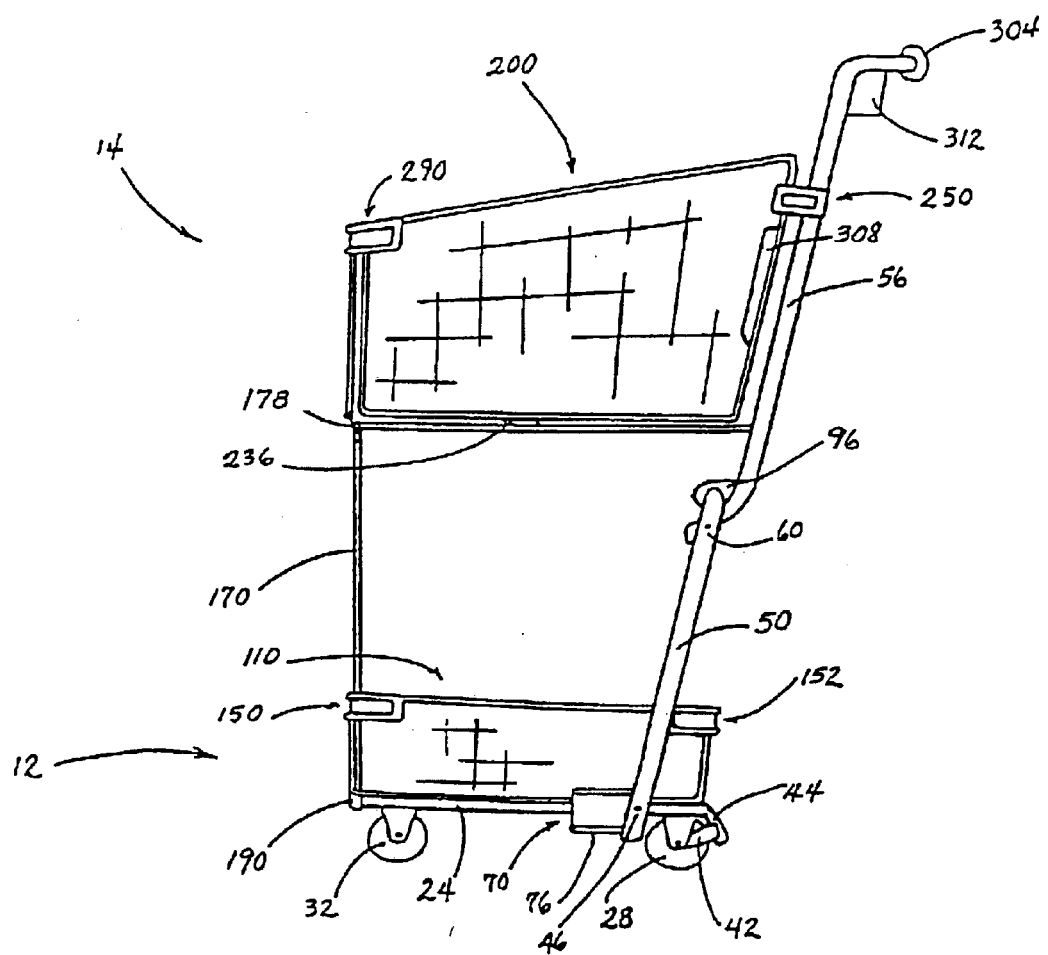
FIG. 2 is a side elevation view of the portable universal cart shown in FIG. 1.
Figure 3:
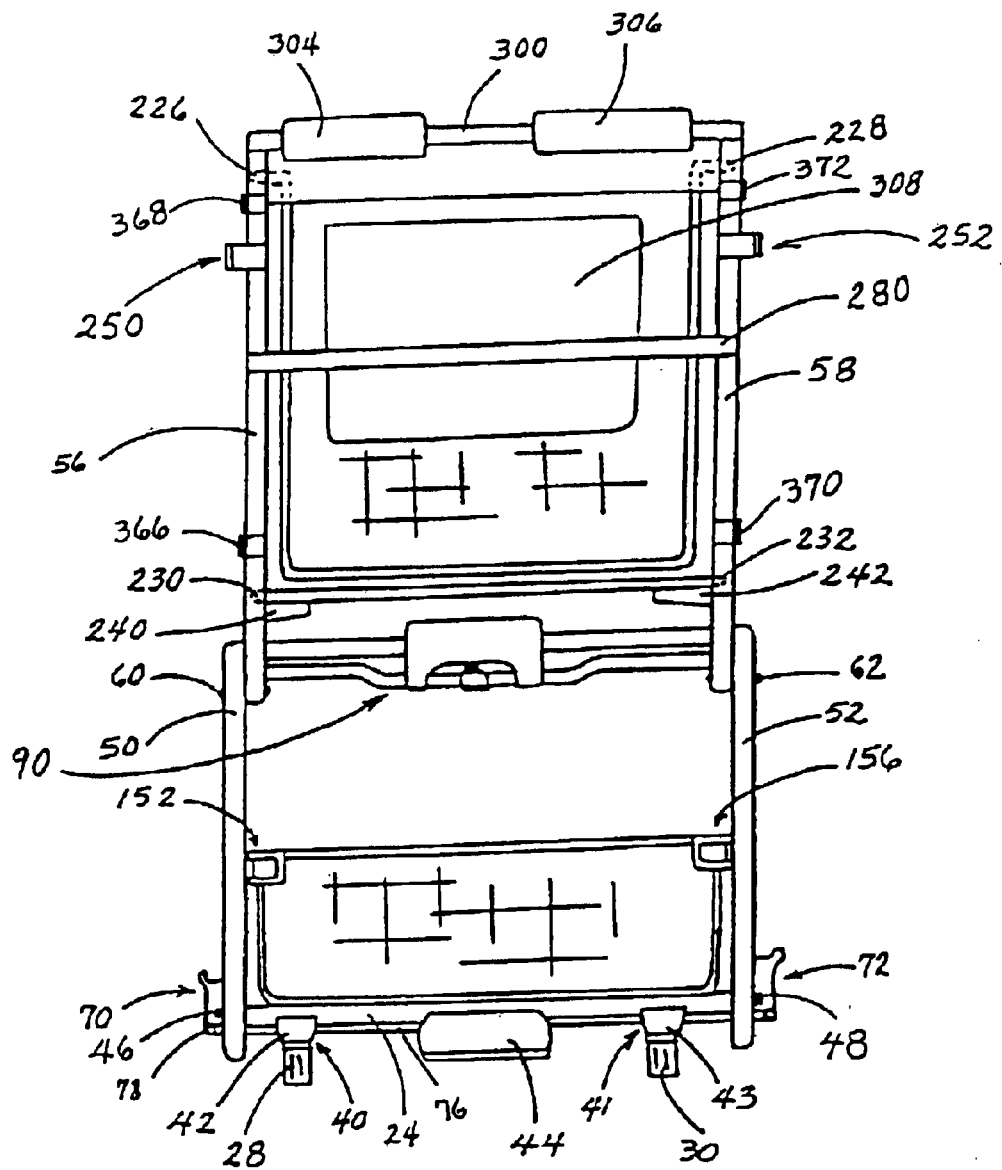
FIG. 3 is a rear elevation view of the portable universal cart shown in FIG. 1.

In the preferred embodiment of this invention framework 24 is generally rectangular in configuration, as best illustrated in FIG. 1. The base portion has two rear wheels 28, 30 and two front wheels 32, 34. The two rear wheels 28, 30 and the two front wheels 32, 34 are secured to framework 24 roughly positioned at the corners presented by the rectangular configuration of the framework. This provides the portable universal cart 10 with a stable base having all four wheels touching the ground surface at any one time during normal operation, as illustrated in FIGS. 1, 2 and 3. The wheels 28, 30, 32 and 34 can be retractile.

The wheels used in the preferred embodiment of this invention are generally wide and comprised of a rubber or other materials with a wide tread to the ground surface to provide traction allowing the portable universal cart 10 to traverse a variety of differing surfaces.

The wheels 28, 30, 32 and 34 of the portable universal cart 10 are linked to framework 24 through the plates 36, 37, 38 and 39 firmly secured to framework 24. The rears wheels 28, 30 are rigid and securely fixed to the rear plate 38, 39 respectively. Further, the rear wheels 28, 30 have fastened the brakes mechanism 40, 41, pivotally secured to the wheels 28, 30, as illustrated in FIG. 3. Brakes mechanism 40, 41 includes pedals 42, 43 for placing one's foot and depressing the pedal down to lock the wheels 28, 30 independently or to apply the brake mechanism to both wheels. To release, it just needs to move the pedal up. Pedals 42, 43 will be part of a side cam brake, friction ring brake or other brake system.

The front wheels 32, 34 are swivel, to allow a free movement in all directions and are secured to framework 24 through plate 37, 36 respectively.

A pedal 44 is also provided, as illustrated in FIG. 3, which is connected to the rear of framework 24 and is used to incline the portable universal cart 10 when it is necessary to go to a different surface elevation, for example a sidewalk, step or stair. In this case the user pushes the pedal 44 with one's foot, to incline the portable universal cart 10 with the front extending upwardly to a maximum of 75 grades. It can also be appreciated that by constructing the pedal 44 of a strong durable material, such as aluminum, then the pedal 44 will prevent the portable universal cart 10 from being tilted greater than 75 grades, eliminating any chance the portable universal cart 10 will flip over backwards.

The base portion 12 of the portable universal cart 10 has lower link arms 50, 52. Lower link arms 50, 52 support the upper portion 14 of the portable universal cart 10. Lower link arms 50, 52 are in U shape form by link rod 54, as illustrated in FIG. 1. The upper portion has the upper link arms 56, 58 pivotally secured to lower link arms 50, 52 by pivots 60, 62.

The upper link arms 56, 58 fold clockwise and the lower link arms 50, 52 fold counterclockwise collapsing the upper portion 14 towards base portion 12, as illustrated in FIG. 15, so the portable universal cart 10 can be stored, for example, or carried in a collapsed position, as best illustrated in FIGS. 18 and 19. To effect the collapsing, the lower link arms, 50 and 52 are pivotally secured to the framework 24 by pivots 46, 48, respectively, as best illustrated in FIGS. 2 and 3.

There are locking mechanisms for lower link arms 70, 72 for each arm respectively, to keep in upright position the lower link arms 50, 52, as illustrated in FIGS. 1, 4A, 4B, and 4C.

Locking mechanism for lower link arm 70 comprises part 74. Part 74 is secured to plate 76 through spring hinge 78. Plate 76 is secured to framework 24. Part 74 has special shape, a protuberance with a curve surface 84, to allow moving outside the part 74 when the lower link arm 50 is moving up, as best illustrated in FIG. 4B.

Part 74 has a flat side 80 to allow the lower link arm 50 to be parallel to framework 24, when the universal portable cart 10 is in a foldable configuration. Part 74 has a flange 86, as illustrated in FIGS. 4A, 4B and 4C.

FIG. 4A shows the position of lower link arm 50 when the portable universal cart 10 is in a collapsed position. When the portable universal cart 10 goes from the collapsed position to the upright position, the lower link arm 50 is moving up and start to slide through the protuberance with a curve surface 84, pushing the part 74 outside, as best illustrated in FIG. 4B. This movement continuous until lower link arm 50 reaches the end of the protuberance with a curve surface 84 and get the upright position as illustrated in FIG. 4C. Then, the part 74 goes back suddenly to the original position helped by the spring hinge 78, locking the lower link arm 50, and avoiding falling down. Further, lower link arms 50, 52 and the rest of the upper portion 14 will not flip over backwards; because arms 50, 52 will stop when reach the plate 76, as illustrated in FIG. 2.

When collapsed position is desired, flange 86 is used to push out part 74, allowing arm 50 to fold down.

This description made for the locking mechanism for lower link arm 70, applies to the identical locking mechanism 72, for the lower link arm 52, as best illustrated in FIG. 1. Locking mechanisms for lower link arms 70, 72 of this invention for the portable universal cart 10 can be extended to any foldable cart used with different purposes, as a locking mechanism to keep a cart in upright position.

Once the lower link arms 50, 52 and rod 54 are secured in the upright position by the locking mechanisms for lower link arms 70, 72, it will be possible to unfold the upper portion 14. The upper portion 14 is linked to the base portion 12 by upper link arms 56, 58.

Upper link arms 56, 58 are pivotally secured to lower link arms 50, 52 by pivots 60, 62 as best illustrated in FIGS. 2 and 3. To hold the upper portion 14 in an upright position as illustrated in FIG. 15, there is a locking mechanism for upper link arms 90 associated to upper link arms 56, 58, as illustrated in FIGS. 1 and 5. Locking mechanism for upper link arms 90 comprise a rod 92 in U shape, rigid secured to upper link arms 56, 58; a spring grip 96, which slide around rod 92 through tubular shape parts 97, 98. Spring grip 96 has tube 99 with a grip 100 firmly secured to rod 92 and a spring 101. Spring 101 is connected between the movil part of spring grip 96 and the grip 100, allowing the spring grip 96 to grasp rod 54 with pressure.

When upper portion 14 is moving up to unfold the portable universal cart 10, the locking mechanism for upper link arms 90 with upper link arms 56, 58 are moving counter-clockwise until reaches the rod 54 belong to the base portion 12. The first contact with rod 54 is the spring grip 96. Spring grip 96 has a curve shape 102 at the end, allowing the spring grip 96 to slide smoothly through the rod 54 until it grasps the rod 54. Spring 101 will keep the upper portion 14 secured. Spring grip 96 has a lever 104. When collapsed position is desired, pushing up the lever 104 with one's hand, release the upper portion 14 from the base portion 12.

Locking mechanism for upper link arms 90 of this invention for the portable universal cart 10, applies to any foldable cart used with different purposes as a locking mechanism to keep a cart in an upright position.

The upper portion 14 will hereinafter be described.

The base portion 12 has a base basket 110, used for shopping or moving items, as illustrated in FIGS. 1 and 2. Base basket 110 comprises two lateral foldable screens 112 and 114, a rear foldable screen 116 and a front foldable screen 118. Base basket 110 has a bottom screen 120, as illustrated in FIG. 1. The bottom screen 120 is secured to the framework 24. All these screens can be strong to support heavy loads.

Foldable screens 112, 114, 116 and 118 can fold down by hinges 122, 124, 126 and 128, attached between the foldable screen and the bottom screen 120.

Figure 6:
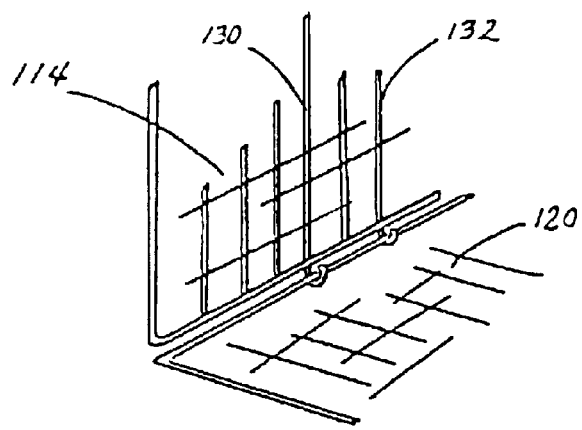
FIG. 6 is a perspective view of the foldable lateral screen and bottom screen attached by two bended rods working as a hinge.

Hinges 122, 124, 126 and 128 can be spring hinges to allow going up easily or just two prolonged rods 130, 132 of foldable screens 112, 114, 116 and 118 bended in one of the rod of the bottom screen 120, as best illustrated in FIG. 6.

Rear and front foldable screens 116, 118 fold down first, and laterals foldable screens 112, 114 after. It means, when the portable universal cart 10 is in the collapsed position, to build the base basket 110, first it will unfold foldable screens 112, 114 and after unfold foldable screens 116, 118.

Foldable lateral screen 112 has the locking mechanisms 150, 152 at each end of the screen and foldable lateral screen 114 has the locking mechanisms 154, 156 at each end of the screen, too, as best illustrated in FIGS. 1, 2, 3, 7 and 8.

Locking mechanism 150 comprises a bended plate 158 in U shape, secured to lateral foldable screen 112, a magnet 160 secured to plate 158, that hold in an upright position the front foldable screen 118, through the iron plate 162 firmly secured to rod 161, belong to the front foldable screen 118. Further, iron plate 162, as soon is secured with magnet 160, locks the lateral foldable screen 112, too. The U shape of plate 158, grasp iron plate 162, not allowing moving the lateral foldable screen 112.

Figure 7:
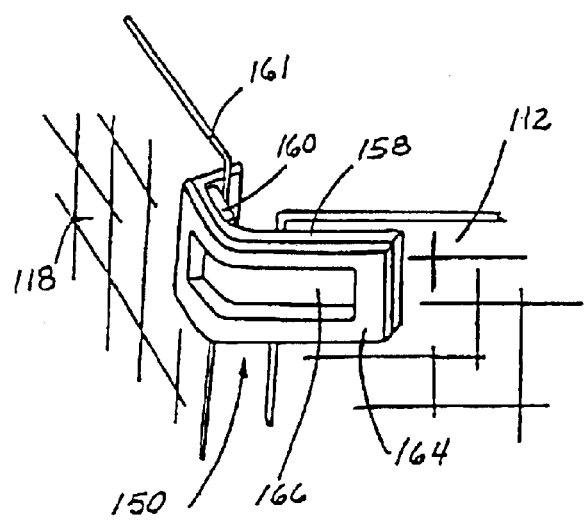
FIG. 7 is a perspective view of the locking mechanism for the front and rear foldable screens for the base basket and front foldable screen of the upper basket.
Figure 8:
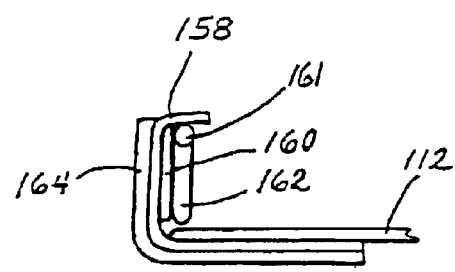
FIG. 8 is a top plan view of the locking mechanism for the front and rear foldable screen of the base basket and front foldable screen of the upper basket.

Locking mechanism 150 has a pad 164 to avoid impacts when the portable universal cart 10 is in movement. Inside the pad 164, there is a reflecting surface 166, useful when the portable universal cart is used at night to avoid an accident, as illustrated in FIG. 7.

All this description made for the locking mechanism 150, applies to identical locking mechanisms 152, 154 and 156.

Figure 9:
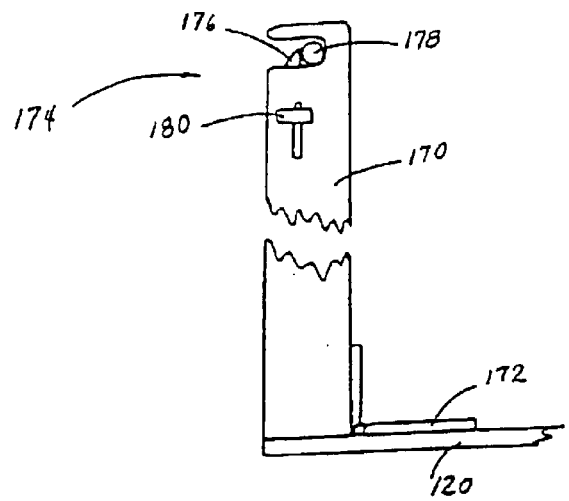
FIG. 9 is a side elevation view of the optional locking mechanism to hold the main basket is a heavy load is carried.

Finally, base portion 12 has a bar 170. One end of the bar 170 is secured to the bottom foldable screen 120 with a hinge 172, as illustrated in FIG. 2. This bar 170 is an option, and only used to support the upper basket 200, when it carries heavy load. The bar 170 has at the other end a locking mechanism 174, as best illustrated in FIG. 9. Locking mechanism 174 consist of a spring bolt 176 with a lever 180. The upper basket 200 has the rod 178, as illustrated in FIGS. 1, 2 and 9. The bar 170, when used, is moving from horizontal to vertical position until it reach the rod 178. The rod 178 is pushing the spring bolt 176, allowing to move down until rod 178 is secured to the bar 170. Lever 180 is attached to spring bolt 176, allowing the user to move the spring bolt 176 down, and the rod 178 is released.

The base portion 12 has certain features that not only provides a useful function, but also serve to finish the appearance of the final portable universal cart 10. In particular, base portion includes in front thereof a pad 190, as illustrated in FIGS. 1 and 2. Additional ones can be provided around the base where impacts are likely to be encountered.

The Upper Portion

The upper portion 14 of portable universal cart 10 comprises the upper basket 200 used for shopping or moving items. Further, in the preferred embodiment, upper portion 14 comprises a storage section, a receptacle with different compartments and devices to hold specific items, all as will hereinafter be described.

As previously mentioned, the upper link arms 56, 58 connect upper portion 14 to the lower link arms 50, 52 belong to the base portion 12. FIGS. 1 and 2 illustrate how the link arms are pivotally connected.

Upper link arms 56, 58 are bended at the end of the arm attached to lower link arms 50, 52.

Once the locking mechanism for upper link arms 90 grasps the rod 54, the portable universal cart 10 is in condition to open the upper basket 200.

The upper basket 200 comprises rear foldable screen 210, bottom foldable screen 212, lateral foldable screens 214, 216 and front foldable screen 218, as best illustrated in FIG. 1. When all foldable screens of upper basket 200 are collapsed, as illustrated in FIG. 17, the rear foldable screen 210 is the most internal, then lateral screens 214, 216. After the front foldable screen 218 and finally the bottom foldable screen 212.

Rear foldable screen 210 is pivotally connected to upper link arms 56, 58 by pivots 226, 228, as illustrated in FIG. 3. Bottom foldable screen 212 is pivotally connected to upper link arms 56, 58 by pivots 230, 232, as best illustrated in FIG. 3. Laterals foldable screens 214, 216 and front foldable screen 218 are connected to the bottom foldable screen by hinges 234, 236, 238 respectively. Hinges 234, 236, 238 can be spring hinges to allow going up easily or just two prolonged rods of each lateral and front screen to be bended in one of the rods of bottom foldable screen 212, using the same principle shown in FIG. 6 when base basket 110 was described.

To fold the upper basket 200 illustrated in FIG. 2, first the front foldable screen 218 is folding down until bottom foldable screen 212 is reached. Then rear foldable screen 210 is moving clockwise to allow the lateral foldable screens 214, 216 to fold down over the front foldable screen 218 and bottom foldable screen 212. After, rear foldable screen is moving back to reach his original position. Now, all foldable screens, except rear foldable screen 210 are moving clockwise as a screen package 239 through the pivots 230, 232, to reach the rear foldable screen 210, as best illustrated in FIG. 15.

To unfold the upper basket 200, first, the screen package 239 is moving counterclockwise until the bottom foldable screen 212 reach the horizontal position stopped by plates 240, 242 secured to upper link arms 56, 58, as illustrated in FIGS. 1 and 3. Then rear foldable screen 210 is moving clockwise to allow lateral foldable screens 214, 216 to unfold.

Figures 10, 11:
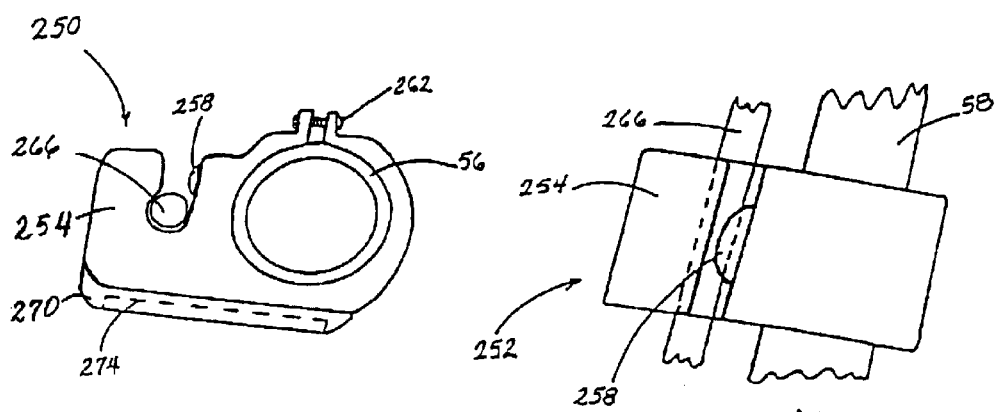
FIG. 10 is a top plan view of the locking mechanism for the foldable lateral screen of the upper basket.
FIG. 11 is a side sectional view of the locking mechanism for the foldable lateral screen of the upper basket.

There are locking mechanisms 250, 252 to hold lateral foldable screens 214, 216 in vertical position, as illustrated in FIGS. 1, 10 and 11. There is a rod 266 belong to the lateral foldable screen 214.

Locking mechanism 250 comprises a clamp 254 and a spring bolt 258. Clamp 254 has a U shape form to receive and hold a rod 266 from the lateral foldable screen 214.

Clamp 254 is firmly secured to upper link arm 56 through a screw 262 or sold. Clamp 254 is rigid, except the spring bolt 258, to hold and grasp the rod 266, avoiding collapse the upper basket 200, keeping the upper basket 200 in horizontal position, as well plates 240, 242 keep the bottom foldable screen 212 in horizontal position, too.

Locking mechanism 250 has a pad 270 to avoid impact when the portable universal cart 10 is in movement and to protect the reflecting surface 274 when the portable universal cart 10 is used at night, as illustrated in FIGS. 1 and 10.

This description applies to identical locking mechanism 252 for the lateral foldable screen 216. The locking mechanisms 250, 252 are illustrated in FIGS. 1, 10 and 11. There is a plate 280 secured to arms 56, 58 to hold rear foldable screen 210, as illustrated in FIG. 3.

As soon lateral foldable screens 214, 216 are holding up by the locking mechanisms 250, 252, the rear foldable screen 210 is moving counter-clockwise until plate 280 stop this movement and keeps the rear foldable screen 210 in the right position, as illustrated in FIGS. 1 and 3.

Finally, the front foldable screen 218 is unfolded and locked by the locking mechanisms 290, 292 to avoid folding down or moving out foldable screens 218, 214 and 216, as illustrated in FIGS. 1 and 2. Locking mechanisms 290, 292 was already described in the base portion 12 as locking mechanisms 150, 152, 154 and 156.

Front foldable screen 218 has a plate 294 to identify the registered trademark for this invention. The upper basket 200 can be constructed of lighter screens than base basket 110 since heavy items will be generally carried by base basket 110.

Figure 12:
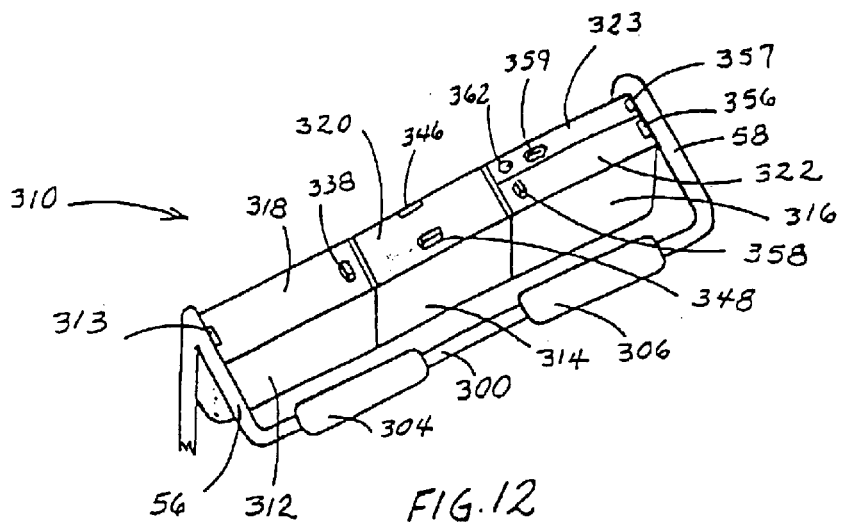
FIG. 12 is a perspective view of the receptacle with compartments existing in the upper portion.

In the preferred embodiment, upper portion 14 includes the upper link arms 56, 58 that extend upwardly towards the user to joint both arms by rod 300, as illustrated in FIGS. 1 and 12. Another rod 302 is firmly secured to upper link arms 56, 58, as best illustrated in FIG. 1.

Rod 302 has a clip 303 to hold the screen package 239, as illustrated in FIGS. 1 and 15. Rod 300 comprises two pieces of rubber pads 304, 306. Rubber pads 304, 306 are spaced apart appropriately so that the user feels comfortable pushing the portable universal cart 10 and fatigue is minimized.

The upper portion 14 comprises a flexible storage section 308, assigned to handbags, CD player, snacks or the like can be stored, as illustrated in FIGS. 1, 2 and 3.

Figure 13:
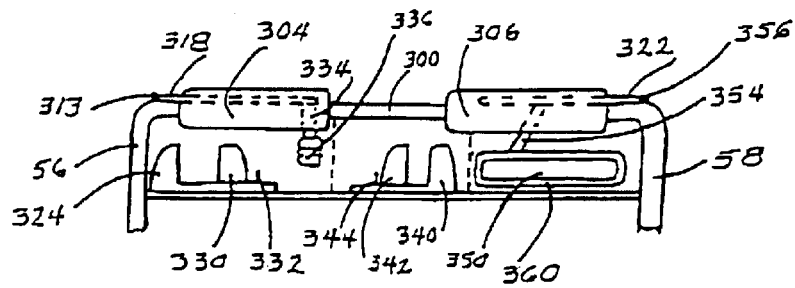
FIG. 13 is a rear elevation view of the receptacle with all compartments closed, existing in the upper portion.
Figure 14:
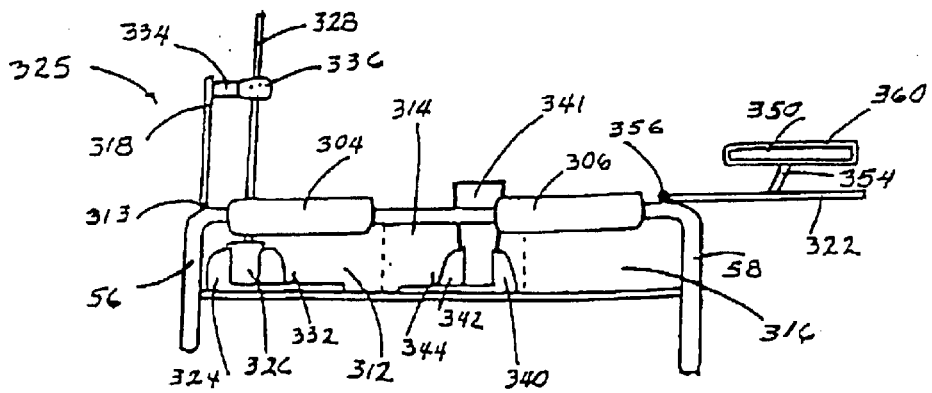
FIG. 14 is a rear elevation view of the receptacle with all compartments open, existing in the upper portion.

Further, upper portion 14 comprises a receptacle 310, as illustrated in FIG. 12. FIGS. 13 and 14 illustrate the inside of compartments belongs to receptacle 310. Receptacle 310 is a rectangular box, fastened to upper link arms 56, 58 and rod 302. Receptacle 310 includes four compartments 312, 314, 316 and 317, as best illustrated in FIGS. 1 and 12. Each compartment has a lid 318, 320, 322 and 323 respectively to keep closed the compartments.

Compartment 312 is the first compartment. It has a device 325. Device 325 comprises an adjustable holder 324, as illustrated in FIGS. 13 and 14, with the purpose to hold an umbrella (not illustrated). The umbrella has a handle 326 and the stick 328 as illustrated in FIG. 14. Adjustable holder 324 has a movable part 330 to adjust the handle of the umbrella 326 and a lock 332 to keep this position. Compartment 312 has a lid 318. Compartment 312 has a hinge 313 secured to lid 318 allowing opening the compartment 312. Device 325 has a plate 334 secured to lid 318. Plate 334 has secured a grip clip 336 at the other end. Lid 318 has a lever 338 to allow opening the compartment 312. When the lid 318 is open in an upright position, using the lever 338, the grip clip 336 hold the stick 328 belong to the umbrella, avoiding falling down, so the umbrella, when used, extends upwardly and above the upper basket 200 and the user, keeping the user and items inside the basket dry, as best illustrated in FIG. 14.

Compartment 314 is the second compartment. It has an adjustable holder 340 to retain a glass, a can or a bottle 341 as illustrated in FIGS. 13 and 14. Adjustable holder 340 has a movable part 342 to adjust the side of the container to hold. Adjustable holder 340 has a lock 344 to keep the desired position. Compartment 314 has a lid 320. Compartment 314 has a hinge 346 secured to the lid 320. Lid 320 has a lever 348 to allow opening this compartment when it is used.

The third compartment is the compartment 316. It holds a rear view mirror 350, as illustrated in FIGS. 13 and 14.

Rear view mirror 350 has an arm 354 secured to the internal side of lid 322. Compartment 316 has a hinge 356 secured to lid 322 with a lever 358 attached to lid 322, allowing opening the compartment 316. When is open totally, the mirror 350 is out of the compartment 316 and stop as soon the lid 322 reaches the upper link arm 58, as illustrated in FIG. 14. Rear view mirror 350 has a rubber frame 360 for protection.

The fourth compartment 317 is a small compartment to hold values (wallet, credit cards or cash), as illustrated in FIG. 1. Compartment 317 has a lid 323. Compartment 317 has a hinge 357 secured to lid 323. Lid 323 has a key lock 362 for security. Lid 323 has a lever 359 to open the compartment 317, as illustrated in FIGS. 1 and 12.

Finally, FIGS. 15, 16 and 17 show different configurations beside the main configuration illustrated in FIG. 1. It means portable universal cart 10 can be used as displayed on FIG. 1 when user needs to use both baskets. To carry few items the portable universal cart 10 configuration illustrated in FIG. 16 can be selected. In both configurations as illustrated in FIGS. 1 and 16, the rear foldable screen 210 is pivotally on the top, allowing putting a long item in the upper basket 200, if it is necessary. The configuration illustrated in FIG. 17 is convenient when the user carried an ornamental plant or tree for example; or if it is necessary to carry a luggage or boxes, the configuration illustrated in FIG. 15 will be the best. All these configurations show a really portable universal cart device.

The portable universal cart 10 can be fold and unfold in seconds.

FIG. 18 illustrated the portable universal cart 10 in the collapsed position. Upper link arm 56 has clips 366, 368 to hold the portable universal cart 10 in a foldable position. Clips 366, 368 grasp the mainframe 24. Upper link arm 58 has clips 370, 372 to grasp mainframe 24 for the same function, as illustrated in FIG. 3. In this position the portable universal cart 10 can be wrapped in a suitable cover 364 for storage or transportation as the case might be, particularly to put inside the trunk of the vehicle as best illustrated in FIG. 19. Suitable cover 364 has an opening 374 allowing rod 54 to be used as a handle. Suitable cover 364 has a thick zipper 376 to close the cover. Suitable cover 364 can be made of strong synthetic fabric in attractive colors and has a label 378 with the registered trademark. Portable universal cart 10 can be constructed of metal (lightweight aluminum with chrome plate finish, or anodized aluminum in different colors), colored plastic, a mix of these materials or other materials.

It is further noted that other modifications and variations may be made to the present invention, without departing from the spirit and scope of the invention as hereinafter claimed.

What I claim as my invention is:

1. A portable universal cart, comprising:

a base portion having a framework, said framework having an incline pedal attached, whereby downward pressure on the incline pedal inclines the framework, retractable wheels attached to the framework, at least one wheel having a brake, and two lower link arms pivotally attached to the framework, and linked via a rod at the non-pivoting ends of the lower link arms, said lower link arms having a lower link arm locking mechanism for locking the lower link arms in an upright position;

a foldable base basket having lateral, front, and rear foldable base basket screens, the screens pivotally attached to the framework, and a base basket locking mechanism for locking the foldable screens, in an upright position, thereby forming the base basket;

an upper portion having upper link arms pivotally attached to the lower link arms, and linked, via an upper rod at the non-pivoting ends of the upper link arms, said rod having rubber pads for a user to grasp and push the portable universal cart, said upper link arms having an upper link arm locking mechanism for locking the upper link arms in an upright position;

a foldable upper basket having lateral, front, rear and bottom foldable upper basket screens pivotally attach to the bottom foldable upper basket screen, and an upper basket locking mechanism for locking the foldable upper screens in an upright position thereby forming the upper basket; and a receptacle fastened to the upper link arms, said receptacle having a plurality of compartments adapted for securing various items.

2. The cart of claim 1, wherein the lower link arm locking mechanism comprises:

a part, said part having a protuberance with a curved surface; and a spring hinge attaching the part to the base portion, whereby when said lower link arms move upward, the lower link arms slide over the curved surface of the part, thereby pushing the part against the spring hinge until the lower link arms move past the curved surface and the spring hinge returns the pail to its pre-pushed position.

3. The cart of claim 1, the upper link arm locking mechanism comprising:

a U-shaped rod secured to the pivoting ends of the upper link arms;

a spring grip having fixed and curved ends, the spring grip fixed and rotatable around the U-shaped rod at the fixed end of the spring grip, and the curved end grasping the rod of the lower link arms for locking the upper link arms in an upright position.

4. The cart of claim 1, further comprising:

a bottom base basket screen attached to the framework; and hinges attaching the lateral, front, and tear foldable base basket screens to the bottom base basket screen.

5. The cart of claim 1, wherein the bottom and rear foldable upper basket screens arc pivotally attached to the upper link arms.

6. The cart of claim 1, wherein the baskets, upper portions and lower portions are foldable.

7. The cart of claim 1, wherein the base basket locking mechanism further comprises:

U-shaped banded plates secured to each of the lateral foldable base basket screens;

iron plates, one on each of the front and rear foldable base basket screen; and magnets attached to each of the U-shaped bonded plates, whereby when the foldable base basket screens are in an upright position the magnets of the U-shaped banded plates attract and hold the iron plates of the front and rear foldable base basket screen.

8. The cart of claim 1, wherein the upper basket locking mechanism further comprises:

U-shaped banded plates secured to each of the lateral foldable upper basket screens;

iron plates, one on each of the front and rear foldable upper basket screen and magnets attached to each of the U-shaped bended plates, whereby when the foldable upper basket screens are in an upright position the magnets of the U-shaped bended plates attract and hold the iron plates of the front and rear foldable upper basket screen.

9. The cart of claim 1, further comprising:

lateral upper basket screen locks, at least one pivotally attached to each of the upper link arms, said lateral upper basket screen locks having a U-shaped clamp for engaging an edge of a lateral foldable upper basket screen; and a spring bolt recessed in the U-shaped clamp for holding the edge of a lateral foldable upper basket screen.

10. The cart of claim 1, wherein the incline pedal is attached to the framework ear the rear wheels, whereby downward pressure on the incline pedal pivots the cart around the rear wheels, thereby raising the front of the cart.

11. The cart of claim 10, wherein the incline pedal has a length and shape that prevents the cart from tilting over.

12. The cart of claim 1, wherein the compartments of the receptacle are selected from the group of compartments consisting of an umbrella compartment, a beverage compartment, a mirror compartment and key-lockable compartment.

13. The cart of claim 1, further comprising:

protective pads, attached to the base portion and the upper portion; and reflective surfaces attached to the base portion and the upper portion.

14. The cart of claim 1, wherein the foldable base basket and the foldable upper basket are both open.

15. The cart of claim 1, wherein the foldable base basket and the foldable upper basket are both closed.

16. The cart of claim 1, wherein the foldable base basket and the foldable upper basket are in opposite states, one being open, the other closed.

* * * * *